(12) United States Patent
Gonsalves et al.

(10) Patent No.: US 7,447,769 B2
(45) Date of Patent: *Nov. 4, 2008

(54) RECEIVING NETWORK METRICS DATA FROM DISPARATE DEVICES AND DISPLAYING IN A HOST FORMAT

(75) Inventors: Brian A. Gonsalves, Pleasanton, CA (US); Sherri D. Pena, Martinez, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 74 days.

This patent is subject to a terminal disclaimer.

(21) Appl. No.: 11/511,341

(22) Filed: Aug. 29, 2006

(65) Prior Publication Data

US 2006/0294232 A1    Dec. 28, 2006

Related U.S. Application Data

(63) Continuation of application No. 10/348,962, filed on Jan. 23, 2003, now Pat. No. 7,120,689.

(51) Int. Cl.
*G06F 15/173* (2006.01)

(52) U.S. Cl. ..................... 709/224; 709/223

(58) Field of Classification Search .......... 709/224, 709/225, 227, 223
See application file for complete search history.

(56) References Cited

U.S. PATENT DOCUMENTS

| | | | | |
|---|---|---|---|---|
| 5,285,494 A | * | 2/1994 | Sprecher et al. | ............ 455/423 |
| 5,768,261 A | | 6/1998 | Brownmiller et al. | |
| 5,794,009 A | | 8/1998 | Coleman et al. | |
| 5,867,483 A | * | 2/1999 | Ennis et al. | ............ 370/252 |
| 6,032,154 A | | 2/2000 | Coleman et al. | |
| 6,058,102 A | * | 5/2000 | Drysdale et al. | ............ 370/252 |
| 6,128,628 A | | 10/2000 | Waclawski et al. | |
| 6,345,239 B1 | | 2/2002 | Bowman-Amuah | |
| 6,363,421 B2 | | 3/2002 | Barker et al. | |
| 6,377,955 B1 | * | 4/2002 | Hartmann et al. | ........ 707/104.1 |
| 6,405,251 B1 | | 6/2002 | Bullard et al. | |
| 6,418,467 B1 | | 7/2002 | Schweitzer et al. | |
| 6,446,200 B1 | | 9/2002 | Ball et al. | |
| 6,516,324 B1 | | 2/2003 | Jones et al. | |
| 6,564,174 B1 | | 5/2003 | Ding et al. | |
| 6,611,500 B1 | | 8/2003 | Clarkson et al. | |
| 6,615,186 B1 | | 9/2003 | Kolls | |
| 6,708,224 B1 | | 3/2004 | Tsun et al. | |

(Continued)

OTHER PUBLICATIONS

"Traffic Flow Measurements within IP Networks: Requirements, Technologies and Standardization", Quittek et al., NEC Europe Ltd., 2002, <http://www.itrc.net/sympo/saint2002/pdf/Quittek.pdf>.

*Primary Examiner*—Nathan Flynn
*Assistant Examiner*—Mohammad A Siddiqi
(74) *Attorney, Agent, or Firm*—Greenblum & Bernstein, P.L.C.

(57) ABSTRACT

Transmitting network metrics data from disparate client platforms to a service provider for the calculation of performance measurements so that the level of service may be verified. The metrics data is received by the service provider in formats associated with the subscriber's platform. When the metrics data is received by the service provider, it is converted into a host format so that it may be presented to the network subscribers.

20 Claims, 5 Drawing Sheets

U.S. PATENT DOCUMENTS

| | | |
|---|---|---|
| 6,782,421 B1 | 8/2004 | Soles et al. |
| 6,792,459 B2 | 9/2004 | Elnozahy et al. |
| 6,798,742 B1 | 9/2004 | Mawhinney et al. |
| 6,975,617 B2 | 12/2005 | Walker et al. |
| 7,120,689 B2 * | 10/2006 | Gonsalves et al. .......... 709/223 |
| 2002/0013841 A1 | 1/2002 | Schweitzer et al. |
| 2002/0013842 A1 | 1/2002 | Schweitzer et al. |
| 2002/0013843 A1 | 1/2002 | Schweitzer et al. |
| 2002/0089985 A1 | 7/2002 | Wahl et al. |
| 2002/0091811 A1 | 7/2002 | Schweitzer et al. |
| 2002/0120624 A1 | 8/2002 | Givoly et al. |
| 2002/0131369 A1 | 9/2002 | Hasegawa et al. |
| 2003/0120539 A1 | 6/2003 | Kourim et al. |
| 2004/0119715 A1 | 6/2004 | Everett et al. |
| 2004/0261116 A1 | 12/2004 | McKeown et al. |

\* cited by examiner

RECEIVING NETWORK METRICS DATA FROM DISPARATE DEVICES AND DISPLAYING IN A HOST FORMAT

CROSS-REFERENCE TO RELATED APPLICATION

This application is a continuation of U.S. patent application Ser. No. 10/348,962, filed on Jan. 23, 2003, now U.S. Pat. No. 7,120,689 the content of which is incorporated by reference herein in its entirety.

BACKGROUND OF THE INVENTION

1. Field of the Invention

The present invention is related to the field of communications. More particularly, the present invention relates to data element retrieval for network performance tracking.

2. Acronyms

Asynchronous Transfer Mode (ATM)
Committed Information Rate (CIR)
Common Reliable Accounting for Network Element (CRANE)
Data Link Connection Identifier (DLCI)
Data Service Unit/Channel Service Unit (DSU/CSU)
Frame Relay (FR)
Management Information Base (MIB)
Permanent Virtual Circuit (PVC)
Service Level Agreement (SLA)
Signaling Network Management Protocol (SNMP)
Virtual Path Identifier/Virtual Channel Identifier (VPI/VCI)

3. Background and Material Information

A service level agreement (SLA) is an agreement between a data network provider and a client (i.e., user) that defines the nature of the services to be provided with respect to the network and establishes a set of measurements (known as metrics) to be used to measure the level of service provided vis-a-vis the agreed to level of service. The metrics may include performance characteristics such as bandwidth, delay, and packet loss. More specifically, the metrics may include provisioning, availability, restoration times for outages, average and maximum outages periods, average and maximum response times, latency, and delivery rates (i.e., throughput). For example, an aspect of the SLA includes the minimum bandwidth that the data network provider has promised to deliver to the client, known as the committed information rate (CIR). Metrics such as bandwidth, delay, and packet loss can assist the client in evaluating the performance of the network, so that the performance may be improved. That is, the client is able to monitor usage trends, identify data communications patterns, resolve network congestion, reduce unused capacity, and plan for improvement before performance is hampered.

The SLA metrics data is passed from the client's hardware devices, using known protocols, to the data network provider. The data network provider typically stores the SLA metrics data in a backend system and prepares the data for presentation to the client.

However, various clients support different systems that are not necessarily compatible with the data network provider's backend system. Thus, the SLA metrics data passed from the clients devices to the data network provider is transmitted in various formats (e.g., a proprietary format). As a result, for reporting the performance SLA data metrics to the client in accordance with the SLA, both the client and the data network provider must have compatible systems. Accordingly, the data network provider is required to install systems compatible with each of its clients in order to provide SLA metrics data to each client. Alternatively, the client would have to upgrade their system as required by the data network provider. Such solutions have proved mutually unsatisfactory.

Therefore, it would be advantageous to offer a service that allows a data network provider to provide network performance data to its clients, regardless of the client platforms. Such a solution would be beneficial to all concerned.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 5 is an excerpt of an exemplary host formatted record, according to an aspect of the present invention.

DETAILED DESCRIPTION OF EMBODIMENTS

Figure 1:
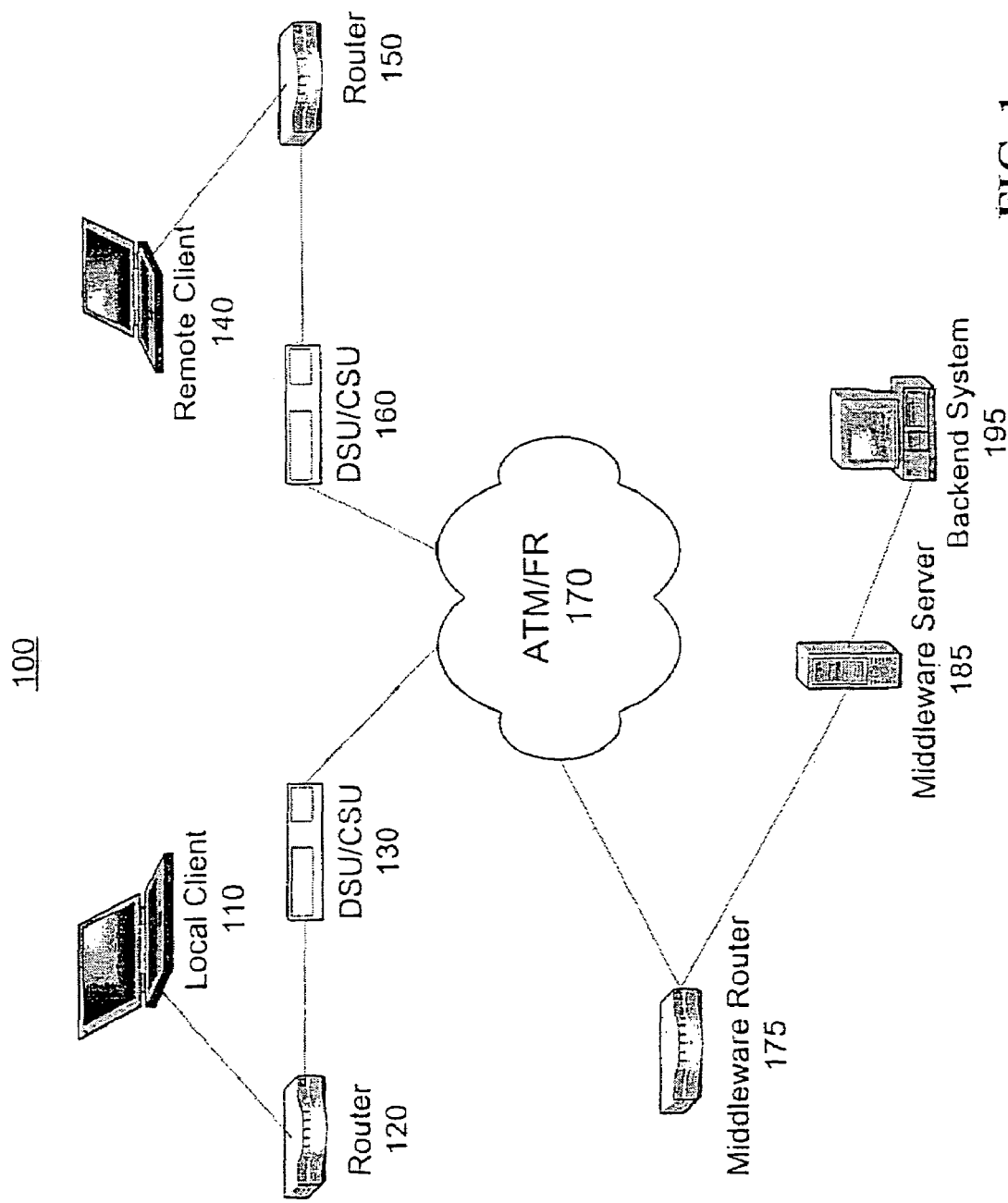
FIG. 1 is a block diagram showing an exemplary telecommunications network, according to an aspect of the present invention.

The present invention relates to an automated process for allowing data network providers to present network performance data in a host format, regardless of the format in which data is received from a client system. Such a system permits clients to subscribe to the data network of any provider, without upgrading to the system requirements of the data network provider. Similarly, data network providers need not alter their backend systems in order to provide the performance data to their clients. For purposes of this application, the terms data network provider and service provider are used interchangeably herein. Likewise, the terms client, user, and subscriber are used interchangeably herein.

In view of the above, the present invention through one or more of its various aspects and/or embodiments is presented to accomplish one or more objectives and advantages, such as those noted below.

Accordingly, one aspect of the present invention is to provide a method for generating performance data in order to verify the level of service provided to a subscriber of a communications network. The method includes receiving metrics data in a format defined by a network device of the subscriber, the data being received from the network device that collects the metrics data, which is associated with data transmissions over the network between a local site of the subscriber and a remote site of the subscriber. Then, parameters are extracted from the received metrics data and a host format consisting of performance data of the network is generated based on the extracted parameters. Subsequently, the performance data is sent to a backend system for presentation to the subscriber.

The method may include determining whether the metrics data already resides in the host format. The data transmissions between the local site of the subscriber and the remote site of the subscriber may take place via a first permanent virtual circuit, while the metrics data may be received via a second permanent virtual circuit. The network device of the subscriber may be a data service unit/channel service unit or a router with an embedded data service unit/channel service unit.

Further, the method may include extracting parameters and generating the host format with a middleware server operating middleware. Also, a determination is made as to the identity of the subscriber to which the metrics data belongs. The network over which the data transmissions take place and in which data is received may be an ATM network or a frame relay network.

Another aspect of the present invention is to provide a method for generating performance data in order to verify the level of service provided to each of a plurality of subscribers of a communications network. The method includes receiving metrics data in a plurality of formats from a first network device of each of the plurality of subscribers, and each of the network devices collecting metrics data associated with data transmissions over the network between the first network device of each subscriber and a second network device of each subscriber. The method further includes mapping the metrics data received from the first network device of each of the plurality of subscribers to each of the plurality of subscribers, in which the mapping associates each of the plurality of subscribers with their respective metrics data. Then, the metrics data is converted into a host format for each of the plurality of subscribers, in which the host format includes performance data of the network for each of the plurality of subscribers. Further, the method includes sending the performance data to a backend system and presenting the performance data to the subscribers.

The method may include making a determination as to whether the metrics data for each of the plurality of subscribers already resides in the host format. Further, the transmissions between the first network device and second network device of each subscriber may take place via a permanent virtual circuit distinct from a permanent virtual circuit in which the metrics data is received from the first network device. Also, the network over which these transmissions take place and in which the data is received may be an ATM network or a frame relay network. The network device may be a data service unit/channel service unit or a router with an embedded data service unit/channel service unit. The metrics data may be converted to the host format at a middleware server operating middleware and further, the host formatted data may be sorted according to customer preferences.

Another aspect of the present invention is to provide a system for generating performance data in order to verify the level of service provided to each of a plurality of subscribers of a communications network. The system includes a router to receive metrics data from a network device of each of the plurality of subscribers, in which the metrics data is received in a plurality of formats associated with each respective subscriber network device. A server is also included to convert the metrics data from the plurality of formats to a host format, in which the host format includes performance data of the network for each of the plurality of subscribers. Further, a database is included to map the metrics data received from each network device to each of the plurality of subscribers. Still further, a backend system stores the data in the host format and permits the subscriber to access the host formatted data. The database may also store customer preferences regarding the host format.

Another aspect of the present invention is to provide a computer readable medium for generating performance data in order to verify a level of service provided to a subscriber of a communications network. A receiving source code segment receives metrics data in a format defined by a network device of the subscriber, in which the data is received from the network device that collects the metrics data, which is associated with data transmissions over the network between a local site of the subscriber and a remote site of the subscriber. An extracting source code segment extracts parameters from the received metrics data, and a generating source code generates a host format based on the extracted parameters, in which the host format includes performance data of the network. Further, a transmitting source code segment transmits the performance data to a backend system, and a displaying source code segment displays the performance data to the subscriber.

FIG. 1 is a block diagram showing an exemplary telecommunications network, according to an aspect of the present invention. The network 100 includes local client 110, router 120, data service unit/channel service unit (DSU/CSU) 130, remote client 140, router 150, DSU/CSU 160, network 170, middleware router 175, middleware server 185, and backend system 195. The subscriber transmits data between local client 110 and remote client 140. For instance, the subscriber may have facilities at local client 110 and remote client 140. Accordingly, data may be transmitted (bi-directionally) between local client 110 and remote client 140 over a permanent virtual circuit (PVC) using the network 170. While only two client sites have been illustrated, it is clear that more than two client sites may be supported by the service. Router 120 receives data from local client 110 via a network such as a LAN, WAN, etc. Router 120 also interfaces between the network of local client and DSU/CSU 130 via a V.35 interface or suitable equivalent. DSU/CSU 130 is operable to condition signals for transfer between the network of local client 110 and network 170. Specifically, for data being sent from local client 110 to remote client 140, DSU/CSU 130 encodes and transmits the data through network 170. DSU/CSU 160 receives the data from network 170, equalizes the received signal, filters the signal, and decodes it for interpretation. Then, the data is sent through router 150 to remote client 140. Router 150 also interfaces between the network of remote client (such as a LAN, WAN, etc.) and DSU/CSU 160 via a V.35 interface or suitable equivalent, for instance. It is noted that the aforementioned steps are reversed for data transmissions from remote client 140 to local client 110.

Further, DSU/CSU 130, or in the alternative, DSU/CSU 160, transmits SLA metrics data to middleware server 185. In an alternative embodiment, router 120 and/or router 150 may have an integrated (i.e., embedded) DSU/CSU that transmits SLA metrics data to middleware server 185. In one embodiment, DSU/CSU 130 is provided with a management information base (MIB) that monitors and stores network performance and diagnostic information concerning the use of network 170, i.e., SLA metrics data. The SLA metrics data may be passed from DSU/CSU 130 to middleware server 185 through middleware router 175 by any transport protocol, including common reliable accounting for network element (CRANE), simple network management protocol (SNMP), NetFlow, etc.

In an exemplary embodiment, network 170 is an asynchronous transfer mode (ATM) switching service or a frame relay network. For ATM switching, DSU/CSU 130 communicates with middleware server 185 through network 170 using conventional ATM signaling, i.e., cell header identifiers known as virtual path identifier/virtual channel identifiers (VPI/VCIs). For frame relay switching, DSU/CSU 130 communicates with middleware server 185 through switch 170 using conventional frame relay signaling, i.e., data link connection identifiers (DLCIs) that identify the nodes of a frame relay communications link.

In an exemplary embodiment, the middleware router 175, middleware server 185, and backend system 195 reside under the auspices of the service provider. Network 170 communicates with middleware router 175 via an ethernet connection (e.g., 10Base-T or 100Base-T), which in turn communicates with middleware server 185 as discussed. Middleware residing on middleware server 185 extracts various parameters from the SLA metrics data received from the client device (e.g., DSU/CSU) and converts the SLA metrics data into a host format for use with backend system 195. In one embodiment, the middleware is written primarily in the Java programming language with some portions coded in the C++ programming language. Middleware server 185 sends the SLA metrics data, in the host format, to backend system 195 using a network of the service provider, e.g., LAN, WAN, etc. The backend system 195 stores the data so that it may be retrieved by the client, for instance, via the world-wide web.

Figure 2:
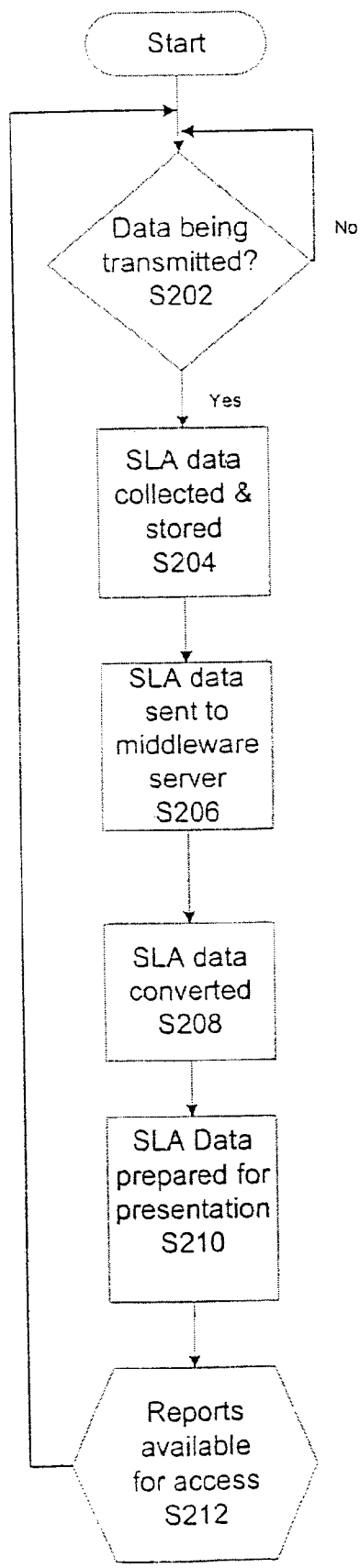
FIG. 2 is an exemplary flow diagram, according to an aspect of the present invention.

FIG. 2 is an exemplary flow diagram, according to an aspect of the present invention. Processing begins with a loop at step S202. At step S202, a determination is made as to whether data is being transmitted over the service provider's network 170 by the subscriber, for example, from local client 110 to remote client 140 or vice-versa. During any such transmissions, performance data is stored at DSU/CSU 130 and/or DSU/CSU 140. Processing continues in the aforementioned loop at step S202 until a YES response is received, in which case processing continues at step S204. At step S204, an access device (e.g., DSU/CSU 130 and/or DSU/CSU 140) collects and stores SLA metrics data sent concerning the data transmission by the client. As previously mentioned, a router with an embedded DSU/CSU may collect and store this information. At step S206, the SLA metrics data stored at the DSU/CSU is sent via a PVC to the service provider in predetermined increments of time, e.g. every five to fifteen minutes. That is, the SLA metrics data is received at middleware server 185 via middleware router 175. The PVC by which the SLA metrics data transmitted is distinct from the PVC that is used send data between local client 110 and remote client 140.

At step S208, middleware server 185 receives the SLA metrics data and converts the SLA metrics data into a host format, as will be discussed later. Also at step S208, the middleware server transmits the SLA data (now in the host format) to the backend system 195. At step S210, the backend system 195 prepares the SLA data for customer presentation. That is, the backend system 195 stores the data so that it may be retrieved by the client, for instance, via the world-wide web. Optionally, the backend system may perform various operations on the host format data, depending upon the agreement between the data network provider and client. Further, the data network provider and client may arrange to have the middleware server 185, backend system 195, or other suitable processor prepare the host formatted data in a customized format as desired by the subscriber. That is, the host formatted data may contain more or less information as desired by the subscriber, or may be sorted according to the client's specifications. In any event, the data is made available to the subscriber at step S212, via the Internet for example.

Figure 3:
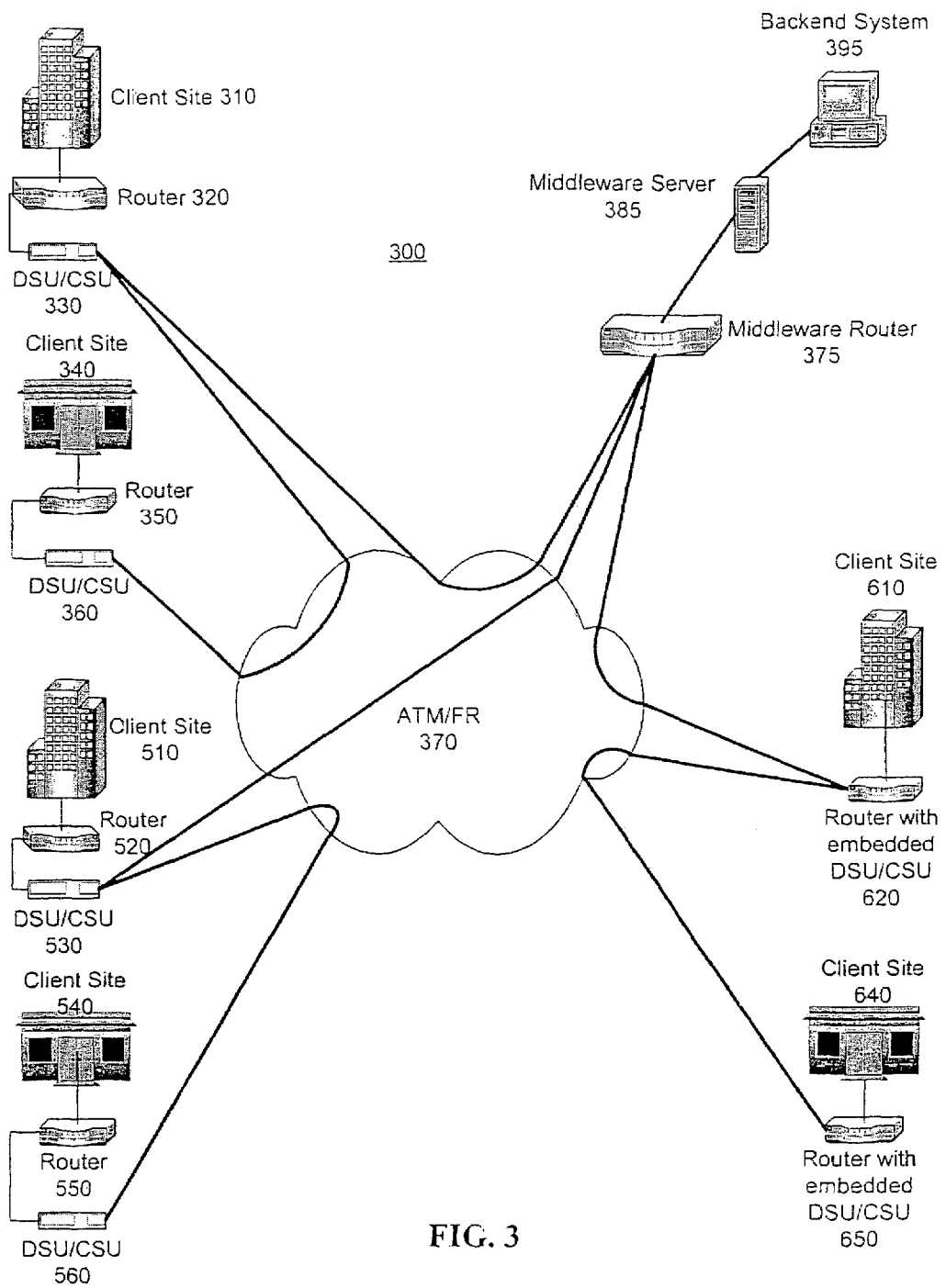
FIG. 3 is a block diagram showing an exemplary telecommunications network, according to an aspect of the present invention.

FIG. 3 is an exemplary telecommunications network, according to another aspect of the present invention. The telecommunications network 300 includes a client site 310, router 320, DSU/CSU 330, client site 340, router 350, DSU/CSU 360, network 370, router 375, middleware server 385, backend system 395, client site 510, router 520, DSU/CSU 530, client site 540, router 550, DSU/CSU 560, client site 610, router with embedded DSU/CSU 620, client site 640, and router with embedded DSU/CSU 650. For purposes of this illustration, it is assumed that client sites 310, 340 pertain to one subscriber, client sites 510, 540 pertain to a second subscriber, and client sites 610, 640 pertain to a third subscriber. Of course, the service is not limited to three subscribers and may contain fewer or more than the number shown.

Data sent by the subscriber is transmitted between client sites 310 and 340 via a PVC over network 370, e.g., ATM or Frame relay. Since the illustration is exemplary in nature, additional facilities may of course be included that communicate with other facilities on the network. A data communication between client sites 310 and 340 will now be described. Data sent from a network (e.g., LAN, WAN) at client site 310 is received at router 320, which passes the data on to DSU/CSU 330 via a V.35 interface, e.g., a serial frame relay, for instance. DSU/CSU 330 receives the data, encodes it, and transmits the data over the network 370 where the data is received by DSU/CSU 360 at client site 340. DSU/CSU 360 equalizes the received signal, filters it, and decodes it for interpretation and sends the data to router 350. The router 350 passes the data to a network (e.g., LAN, WAN) at client site 340. It is noted that the steps are reversed for data transmissions originating from client site 340 and destined for client site 310.

An exemplary DSU/CSU 330,360 is a Verilink 5160 available from the Verilink Corporation. It is noted that the DSU/CSUs and routers are not required to be physically located at the client sites, but may reside off-site. DSU/CSU 330,360 is SNMP compatible, including network management protocol control functions complying with SNMP standards. Accordingly, the SNMP controller of the DSU/CSU 330 is provided with an MIB that monitors and stores network performance and diagnostic information concerning the network 370, i.e., SLA metrics data.

Periodically, every 5-15 minutes for example, the SLA metrics data stored at DSU/CSU 330 is sent via a separate PVC to the service provider. Specifically, the SLA metrics data is received at router 375, which passes the SLA metrics data to middleware server 385. The middleware server 385 receives the SLA metrics data in a client format associated with DSU/CSU 330. Middleware resident on middleware server 385 translates the SLA metrics data into a host format. Thereafter, middleware server 385 transmits the SLA metrics data, now in a host format, to backend system 395. Once the backend system 395 completes this task, then the client may access the SLA metrics data via the Internet.

In another exemplary embodiment of the present invention, another client of the service provider operates at facilities situated at client sites 510 and 540. Data sent by the subscriber is transmitted between client sites 510 and 540 via a PVC over network 370, e.g., ATM or frame relay. A data communication between client sites 510 and 540 will now be described. Data sent from a LAN at client site 510 is received at router 520, which passes the data on to a DSU/CSU 530 via a V.35 interface, e.g., a serial frame relay, for instance. DSU/CSU 530 receives the data, encodes it, and transmits the data over the network 370 where the data is received by DSU/CSU 560 at client site 540. DSU/CSU 560 equalizes the received signal, filters it, and decodes it for interpretation and sends the data to router 550. The router 550 passes the data to a LAN, for instance, at client site 540. It is noted that the steps are reversed for data transmissions from client site 540 to client-site 510.

An exemplary DSU/CSU 530,560 is a Quick Eagle 4200 available from Quick Eagle Networks, Inc. DSU/CSU 530, 560 is SNMP compatible, including network management protocol control functions complying with SNMP standards. Accordingly, the SNMP controller of the DSU/CSU 530 is provided with an MB that monitors and stores network performance and diagnostic information concerning the network 370, i.e., SLA metrics data.

Periodically, every 5-15 minutes for example, the SLA metrics data stored at DSU/CSU 530 is sent via a separate PVC to the service provider. Specifically, the SLA metrics data is received at router 375, which passes the SLA metrics data to middleware server 385. Middleware server 385 receives the SLA metrics data in a client format associated with DSU/CSU 530. Middleware resident on middleware server 385 translates the SLA metrics data into a host format. Thereafter, the middleware server 385 transmits the SLA metrics data, now in a host format, to a backend system 395. Once the backend system 395 completes this task, then the client may access the SLA metrics data via the Internet.

In another exemplary embodiment of the present invention, another client of the service provider operates at facilities situated at client sites 610 and 640. Data sent by the client is transmitted between client sites 610 and 640 via a PVC over network 370, e.g., ATM or frame relay. A data communication between client sites 610 and 640 will now be described. Data sent from a LAN at client site 610 is received at a router with an embedded DSU/CSU 620. The router with DSU/CSU 620 receives the data, encodes it, and transmits the data over the network 370 where the data is received by another a router with an embedded DSU/CSU 650 at client site 640. Router with embedded DSU/CSU 650 equalizes the received signal, filters it, decodes it for interpretation and passes the data to a LAN at client site 640. It is noted that the steps are reversed for data transmissions from client sites 640 to 610. An exemplary router 620, 650 with integrated DSU/CSU is a Cisco 3600 series router available from Cisco Systems, Inc. DSU/CSU 620 is SNMP compatible, including network management protocol control functions complying with SNMP standards. Accordingly, the SNMP controller of the DSU/CSU 620 is provided with an MIB that monitors and stores network performance and diagnostic information concerning the network 370, i.e., SLA metrics data.

Periodically, every 5-15 minutes for example, the SLA metrics data stored at DSU/CSU 620 is sent via a separate PVC to the service provider. Specifically, the SLA metrics data is received at router 375, which passes the SLA metrics data to middleware server 385. The middleware server 385 receives the SLA metrics data in a client format associated with DSU/CSU 620. Software resident on middleware server 385 translates the SLA metrics data into a host format. Thereafter, the middleware server 385 transmits the SLA metrics data, now in a host format, to a backend system 395. Once the backend system 395 completes this task, then the client may access the SLA metrics data via the Internet.

Figure 4:
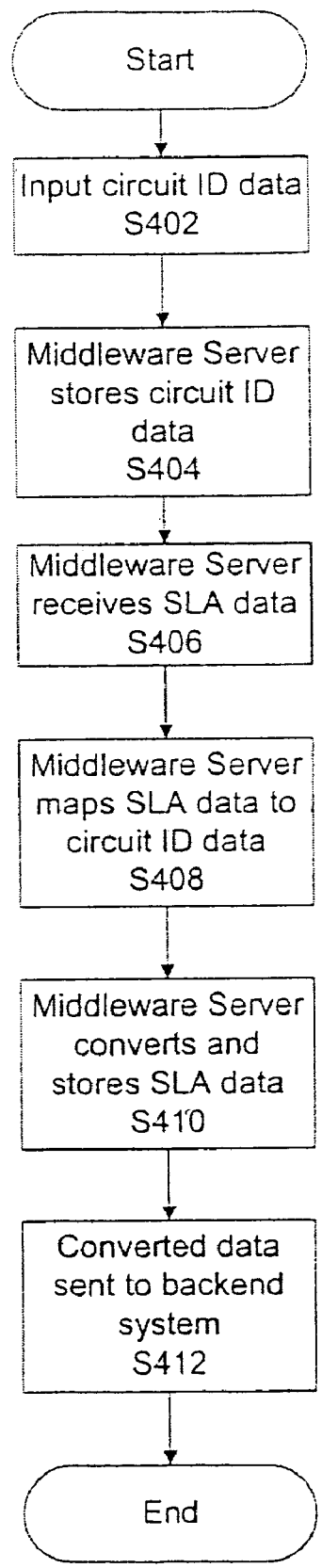
FIG. 4 is an exemplary flow diagram, according to an aspect of the present invention.

FIG. 4 is an exemplary flow diagram for provisioning the system and converting SLA metrics data, according to an aspect of the present invention. Once a subscriber decides to use a particular data network provider, certain information about the subscriber must be stored. That is, at step S402 data is input into a terminal by manual or automated processes. The input data includes information identifying each client, e.g., circuit identification (ID) data appropriate IP addresses of the client devices. Further, client VPI/VCI or DLCI information is included, depending upon whether an ATM or a frame relay network is employed. The circuit ID is a unique identification that the data network provider uses to identify a particular client. A separate circuit ID, IP address, VPI/VCI, and DLCI is stored for each node of the PVC, i.e., each client site. The data is stored in a database residing on middleware server 185 at step S404. Once steps S402-S404 have been completed, the subscriber may begin using data network 170.

At step S406, the middleware server 385 receives the SLA metrics data from a DSU/CSU. In an alternative embodiment, the middleware server 385 or other suitable processor makes a determination as to whether the SLA metrics data already exists in the host format. At step S408, the middleware server maps the received SLA data to the circuit ID data. That is, the SLA metrics data is matched to a particular client, thus identifying the client. At step S410, the middleware server 385 converts the SLA metrics data to a host format. Also at step S410, the host formatted data is stored at the middleware server 385. Optionally, at step S410 the middleware server 385 may perform a variety of calculations or other numeric operations. At step S412, the middleware server 385 transfers the host formatted data to the backend system 395. The host formatted data is transmitted from the middleware server 385 to the backend system 395 at predetermined intervals, e.g., nightly.

Figure 5:
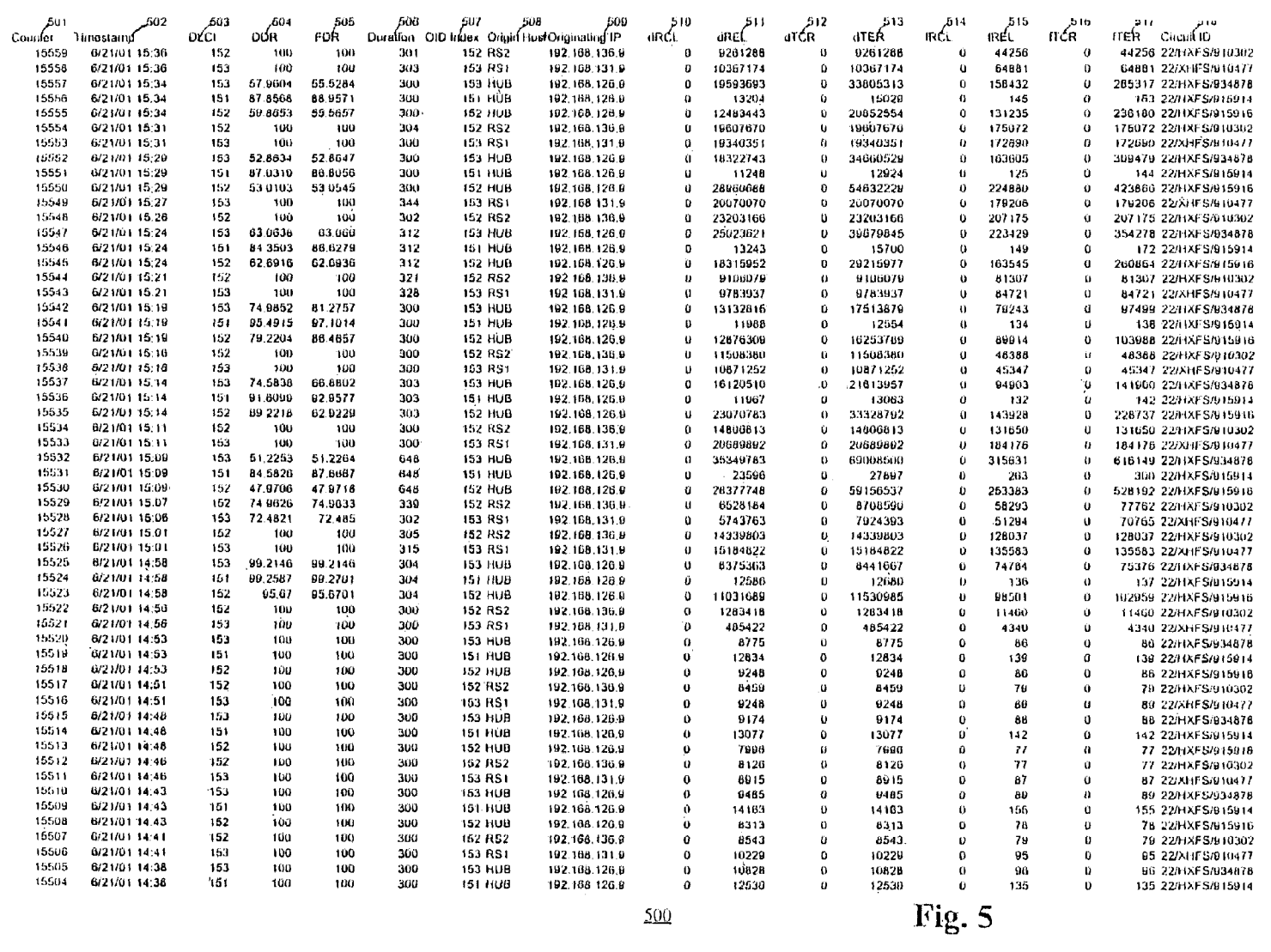

FIG. 5 is an excerpt of an exemplary host formatted record, according to an aspect of the present invention. As discussed, middleware residing on middleware server 185 extracts various parameters from the SLA metrics data received from the client device (e.g., DSU/CSU) and converts the SLA metrics data into a host format for use with backend system 195. Specifically, the middleware takes each of the parameters and places them into appropriate columns on a spreadsheet (e.g. Microsoft Excel) or other suitable software.

Exemplary record 500 includes a counter column 501, a timestamp column 502, a DLCI column 503, a DDR column 504, an FDR column 505, a duration column 506, an OID Index column 507, an Origin Host column 508, an Originating IP address column 509, a dRCL column 510, a dREL column 511, a dTCR column 512, a dTER column 513, an FRCL column 514, an FREL column 515, and fTCR column 516, an fTER column 517, and a Circuit ID column 518. For example, when receiving the SLA metrics data, the middleware extracts each parameter and formats the data in the appropriate columns.

The counter column 501 includes sequentially numbered transactions of transmissions between local client 110 and remote client 140. That is, each transmission between local client 110 and remote client 140 is assigned an identifying number. The timestamp column 502 includes the data and time of the transmission between the client devices. The DLCI column 503 includes the DLCI of the client device.

The DDR column 504 includes the data delivery ratio that reports the network's effectiveness in transporting offered data. The DDR is a ratio of successful payload octets received to attempted payload octets transmitted, i.e., percentage of cells offered to the network that successfully egress the network. As is known, attempted payload octets transmitted are also referred to as offered data. The FDR column 505 includes the frames delivered ratio that reports the network's effectiveness in transporting an offered frame relay load. The FDR is a ratio of successful frame receptions to attempted frame transmissions, i.e., percentage of frames offered to the network that successfully egress the network.

The Duration column 506 includes the duration of the connection. The OID Index column 507 includes the object identifier. The Origin Host column 508 includes an identifier of the host. The Originating IP column 509 includes the IP address of the transmitting DSU/CSU.

The dRCL column 510 includes the number of bytes that were received within the CIR at a local DSU/CSU. The dREL column 511 includes the number of bytes received above (i.e., that exceed) the CIR at the local DSU/CSU. The dTCR column 512 includes the number of bytes transmitted within the CIR at a remote DSU/CSU. The dTER column 513 includes the number of bytes transmitted above the CIR at the remote DSU/CSU.

The fRCL column 514 includes the number of frames received within the CIR at the remote DSU/CSU. The fREL column 515 includes the number of frames received above the CIR at the local DSU/CSU. The fTCR column 516 includes the number of frames transmitted within the CIR at the remote DSU/CSU. The fTER column includes the number of frames transmitted above the CIR at the remote DSU/CSU. The Circuit ID column 518 is the unique identifier that the data network provider used to identify the client.

Further, additional columns may be included such as VPI, VCI, maximum latency, octets sent, octets received, circuit operational status, outage type, and circuit status timestamp. The maximum latency refers to the measurement of time taken for a frame or cell to traverse from one end of a PVC to the other. Outage type indicates whether the outage is due to network or administrative reasons. The circuit status timestamp indicates the date and time in which the circuit goes up and/or down. Other additional columns that may be included are originating and destination DLCIs, origination and destination VPIs and VCIs, and origination and destination circuit IDs. As mentioned previously, a client may arrange with the data network provider to have a specific orientation in which the data may be oriented.

It is noted that DSU/CSUs, other than those discussed herein, may be used with this service. In short, the system of the present invention is compatible with virtually any combination of routers and/or DSU/CSUs. Thus, clients are not compelled to upgrade to hardware requirements of a data network provider. Similarly, data network providers need not alter their backend systems in order to provide SLA metrics data to all of their clients.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a computer readable medium, a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for transfer protocols (e.g., CRANE, SNMP, NetFlow) represent examples of the state of the art. Such standards are periodically superseded by faster or more efficient equivalents having essentially the same functions. Accordingly, replacement standards and protocols having the same functions are considered equivalents

What is claimed is:

1. A method for presenting data in order to monitor performance associated with a network, the method comprising:
   receiving metrics data associated with data transmissions over the network, the metrics data being received in a format defined by a simple network management protocol compatible data service unit/channel service unit in the network, the data service unit/channel service unit comprising a management information base;
   extracting parameters from the received metrics data;
   preparing a host format based on the extracted parameters, the host format comprising performance data of the network; and
   presenting the performance data for a determination of whether actual performance of the network conformed to an expected performance of the network.

2. The method according to claim 1, further comprising preparing the host format when a determination is made that the received metrics data does not reside in the host format.

3. The method according to claim 1, wherein the data service unit/channel service unit comprises a device other than a router.

4. The method according to claim 1, wherein the management information base monitors and stores network performance and diagnostic information associated with the network.

5. The method according to claim 1, wherein the management information base monitors and stores network performance information associated with the network.

6. The method according to claim 1, wherein the management information base monitors and stores diagnostic information associated with the network.

7. The method according to claim 1, wherein the network comprises an asynchronous transfer mode network.

8. The method according to claim 1, wherein the network comprises a frame relay network.

9. The method according to claim 1, wherein the data transmissions comprise data transmissions between a plurality of network nodes associated with a user of the network.

10. The method according to claim 1, wherein the data service unit/channel service unit is embedded in a router.

11. The method according to claim 1, further comprising preparing the performance data for transmission over the Internet.

12. The method according to claim 1, further comprising converting the received metrics data to the host format at a server.

13. The method according to claim 9, wherein each of the plurality of network nodes includes a separate circuit identification, IP address, virtual path identifier/virtual channel identifier, and data link connection identifier.

14. The method according to claim 13, wherein the separate circuit identification, IP address, virtual path identifier/virtual channel identifier, and data link connection identifier of each of the plurality of network nodes is stored on a server that converts the metrics data to the host format.

15. The method according to claim 9, wherein the data transmissions between the plurality of network nodes occur via a first permanent virtual circuit.

16. The method according to claim 15, wherein the receiving of the metrics data occurs via a second permanent virtual circuit.

17. The method according to claim 16, wherein the receiving of the metrics data via the second permanent virtual circuit occurs at predetermined times.

18. A computer readable medium storing a computer program that presents performance data in order to monitor performance associated with a network, the medium comprising:
- a receiving code segment that receives metrics data associated with data transmissions over a network, the metrics data being received in a format defined by a simple network management protocol compatible data service unit/channel service unit in the network, the data service unit/channel service unit comprising a management information base;
- an extracting code segment that extracts parameters from the received metrics data;
- a preparing code segment that prepares a host format based on the extracted parameters, the host format comprising performance data of the network;
- a presenting code segment that presents the performance data for a determination of whether actual performance of the network conformed to an expected performance of the network.

19. The computer readable medium of claim 18, further comprising an internet protocol network presenting code segment that prepares the performance data for transmission over the Internet.

20. A system for generating performance data in order to monitor performance associated with a network, comprising:
- a server that receives metrics data in a format defined by a simple network management protocol compatible data service unit/channel service unit in the network, the server converting the received metrics data to a host format by extracting parameters from the received metrics data, the host format comprising performance data of the network; and
- a storage that stores the performance data for transmission of the performance data for a determination of whether actual performance of the network conformed to an expected performance of the network.

* * * * *